US011673993B2

United States Patent
Behrens et al.

(10) Patent No.: US 11,673,993 B2
(45) Date of Patent: *Jun. 13, 2023

(54) USE OF SALTS AS ACCELERATORS IN AN EPOXY RESIN COMPOUND FOR CHEMICAL FASTENING

(71) Applicant: Hilti Aktiengesellschaft, Schaan (LI)

(72) Inventors: Nicole Behrens, Munich (DE); Alexander Bornschlegl, Munich (DE); Armin Pfeil, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 21 days.

This patent is subject to a terminal disclaimer.

(21) Appl. No.: 17/276,968

(22) PCT Filed: Sep. 9, 2019

(86) PCT No.: PCT/EP2019/073941
§ 371 (c)(1),
(2) Date: Mar. 17, 2021

(87) PCT Pub. No.: WO2020/058018
PCT Pub. Date: Mar. 26, 2020

(65) Prior Publication Data
US 2022/0041797 A1 Feb. 10, 2022

(30) Foreign Application Priority Data

Sep. 19, 2018 (EP) ...................................... 8195409

(51) Int. Cl.
| | | |
|---|---|---|
| C08G 59/02 | (2006.01) | |
| C08G 59/24 | (2006.01) | |
| C08G 59/50 | (2006.01) | |
| C08G 59/56 | (2006.01) | |
| C08K 3/16 | (2006.01) | |
| C08K 3/28 | (2006.01) | |
| C08K 5/42 | (2006.01) | |
| C09K 8/44 | (2006.01) | |
| C09J 163/00 | (2006.01) | |
| C08G 59/68 | (2006.01) | |

(52) U.S. Cl.
CPC ......... *C08G 59/022* (2013.01); *C08G 59/245* (2013.01); *C08G 59/5006* (2013.01); *C08G 59/5026* (2013.01); *C08G 59/5033* (2013.01); *C08G 59/56* (2013.01); *C08K 3/16* (2013.01); *C08K 3/28* (2013.01); *C08K 5/42* (2013.01); *C09K 8/44* (2013.01); *C08K 2003/287* (2013.01)

(58) Field of Classification Search
None
See application file for complete search history.

(56) References Cited

U.S. PATENT DOCUMENTS

| | | | | |
|---|---|---|---|---|
| 4,397,998 | A | * | 8/1983 | De La Mare ......... C08F 283/10 525/523 |
| 5,629,380 | A | * | 5/1997 | Baldwin ................ C09J 163/00 528/92 |
| 6,773,754 | B2 | | 8/2004 | Whiter |
| 10,189,744 | B2 | | 1/2019 | Dureault et al. |
| 2003/0130481 | A1 | * | 7/2003 | Whiter ................... C08G 59/68 528/408 |
| 2015/0093582 | A1 | * | 4/2015 | Buening ................. B32B 37/15 523/400 |
| 2016/0159690 | A1 | | 6/2016 | Dureault et al. |
| 2016/0208042 | A1 | | 7/2016 | Klopsch et al. |
| 2017/0088664 | A1 | * | 3/2017 | Elgimiabi .......... C08G 59/5026 |

FOREIGN PATENT DOCUMENTS

| | | | |
|---|---|---|---|
| EP | 1 319 677 | 6/2003 | |
| GB | 1105772 | 3/1968 | |
| GB | 1105772 A * | 3/1968 | ............. C08G 59/68 |
| JP | H10-506142 | 6/1998 | |
| JP | 2016532742 | 10/2016 | |
| WO | 2015/049229 | 4/2015 | |
| WO | WO-2015195775 A1 * | 12/2015 | ......... C08G 59/5026 |

OTHER PUBLICATIONS

U.S. Appl. No. 17/276,852, filed Mar. 17, 2021, Behrens et al.
U.S. Appl. No. 17/276,914, filed Mar. 17, 2021, Behrens et al.
U.S. Appl. No. 17/276,939, filed Mar. 17, 2021, Nicole Behrens.
International Search Report dated Oct. 24, 2019 in PCT/EP2019/073941, with English translation, 5 pages.
Written Opinion dated Oct. 24, 2019 in PCT/EP2019/073941.

* cited by examiner

*Primary Examiner* — Randy P Gulakowski
*Assistant Examiner* — Ha S Nguyen
(74) *Attorney, Agent, or Firm* — Grüneberg and Myers, PLLC

(57) ABSTRACT

A method includes using at least one salt (S) selected from the salts of nitric acid, salts of nitrous acid, salts of halogens or salts of trifluoromethanesulfonic acid as an accelerator in a multi-component epoxy resin compound for the chemical fastening of construction elements and/or anchoring means. Another method includes the chemical fastening of construction elements and anchoring elements, such as anchor rods, anchor bolts, rods, sleeves, reinforcing bars, screws and the like in boreholes in various substrates.

15 Claims, No Drawings

USE OF SALTS AS ACCELERATORS IN AN EPOXY RESIN COMPOUND FOR CHEMICAL FASTENING

CROSS-REFERENCE TO RELATED APPLICATIONS

This application is a National Stage entry tinder § 371 of International Application No. PCT/EP2019/073941, filed on Sep. 9, 2019, and which claims the benefit of European Application No, 18195409.0, filed on Sep. 19, 2018. The content of each of these applications is hereby incorporated by reference in its entirety.

BACKGROUND OF THE INVENTION

Field of the Invention

The invention relates to the use of at least one salt (S) selected from the group consisting of salts of nitric acid, salts of nitrous acid, salts of halogens and salts of trifluoromethanesulfonic acid as an accelerator in an epoxy resin compound for chemical fastening. The present invention also relates to a method for the chemical fastening of construction elements and anchoring means, such as anchor rods, anchor bolts, (threaded) rods, (threaded) sleeves, reinforcing bars, screws and the like in boreholes in various substrates.

Multi-component mortar compounds based on curable epoxy resins and amine curing agents have been known for some time and are used as adhesives, spackling pastes for repairing cracks and chemical anchors for fastening construction elements such as anchor rods, reinforcing bars, and screws in boreholes of various substrates. For use on outdoor construction sites, the mortar compounds have to be easy to handle in a wide temperature range, and should only have low creep at elevated temperatures. At the same time, the mortar compounds should have a long processing time and should cure quickly and completely in a wide temperature range, and the cured mortar compounds should reach high load values even with moist boreholes and high temperatures, and should have good heat resistance.

These property profiles cannot be easily met. For instance, with conventional mortar compounds it is customary to provide a high proportion of low-viscosity constituents, a low filler proportion and coarse fillers in order to achieve good handling behavior, although this is disadvantageous in terms of low creep behavior under a load at elevated temperatures. In addition, a long processing time is achieved as a result of a high proportion of non-reactive or non-crosslinking diluents and less reactive components, and this prevents a short curing time.

Mortar compounds based on epoxy amine also have slow curing kinetics, an extended pot life or gel time, and usually low heat resistance and creep resistance. This means that they can be handled easily and reach good load values only in a narrow temperature range. The curing time of mortar compounds based on epoxy amine is generally set by selecting an appropriate amine and/or by adding catalysts such as tertiary amines, alcohols and acids. However, these substances, which can be used as accelerators, result in significant changes to the final properties of the cured mortar and often lead to problems with the properties relevant to the application. In particular, negative effects on the strength (load values) of the cured mortar can often be observed.

Description of Related Art

GB1105772 A describes the accelerating effect of inorganic metal salts on the reaction of epoxy resins with amines. As a rule, epoxy-amine systems accelerated accordingly with inorganic salts are used as coatings. This is described, for example, in US2016/053108 A1, US2003/130481 A1 or U.S. Pat. No. 5,958,593. Compositions for use as coatings usually exhibit high mechanical extensibility and are therefore unsuitable for chemical fastening. Mortar compounds for chemical fastening must have a high brittleness in order to have the pull-out strength required for chemical fastening.

SUMMARY OF THE INVENTION

The problem addressed by the invention is therefore that of providing a solution for the chemical fastening of construction elements which allows a considerable reduction in the curing time without impairing the pull-out strength of the mortar compound. In particular, the mortar compounds should be able to withstand loads (90% of the reference load) within a time window of less than 7 hours, in particular less than 4 hours, and should have excellent pull-out strength.

The problem addressed by the invention is solved by using a salt (S) as an accelerator in an epoxy resin compound for chemical fastening according to embodiments below. Preferred embodiments of the use according to the invention are provided in the description below, which may optionally be combined with one another.

The invention also relates to a method for the chemical fastening of construction elements and/or anchoring means according to embodiments described below. Preferred embodiments of the use according to the invention are provided in the below description, which may optionally be combined with one another.

DETAILED DESCRIPTION OF THE INVENTION

Within the context of the invention, the terms used above and in the following description have the following meanings:

"aliphatic compounds" are acyclic or cyclic, saturated or unsaturated carbon compounds, excluding aromatic compounds;

"alicyclic compounds" are compounds having a carbocyclic ring structure, excluding benzene derivatives or other aromatic systems;

"araliphatic compounds" are aliphatic compounds having an aromatic backbone such that, in the case of a functionalized araliphatic compound, a functional group that is present is bonded to the aliphatic rather than the aromatic part of the compound;

"aromatic compounds" are compounds which follow Hackel's rule (4n+2);

"amines" are compounds which are derived from ammonia by replacing one, two or three hydrogen atoms with hydrocarbon groups, and have the general structures $RNH_2$ (primary amines), $R_2NH$ (secondary amines) and RN (tertiary amines) (see: IUPAC Chemical Terminology, 2nd ed. (the "Gold Book"), compiled by A. D. McNaught and A. Wilkinson, Blackwell Scientific Publications, Oxford (1997)): and "salts" are compounds that are made up of positively charged ions (cations) and negatively charged ions (anions). There are ionic bonds between these ions. The expression "salts of nitric acid" describes compounds which are derived from nitric acid ($HNO_3$) and which comprise a nitrate ($NO_3^-$) as an anion. The expression "salts of nitrous acid"

describes compounds which are derived from nitrous acid ($HNO_2$) and which comprise a nitrite ($NO_2^-$) as an anion. The expression "salts of halogens" describes compounds which comprise an element from group 7 of the periodic table as an anion. In particular, the expression "salts of halogens" should be understood to mean compounds which comprise a fluoride ($F^-$), chloride ($Cl^-$), bromide ($Br^-$) or iodide ($I^-$) as an anion. The expression "salts of trifluoromethanesulfonic acid" describes compounds which are derived from trifluoromethanesulfonic acid ($CF_3SO_3H$) and which comprise a triflate ($CF_3SO_3^-$) as an anion. In the context of the present invention, the term "salt" also covers the corresponding hydrates of the salts. The salts (S) used as accelerators are also referred to as "salts" in the context of the present invention.

It has now surprisingly been found that the addition of at least one salt (S) to an epoxy resin compound for chemical fastening leads to a considerable acceleration of the curing reaction. The cured compounds exhibit outstanding pull-out strength and can therefore be subjected to loading after only a short period of time, within approximately 4 to 6 hours, and sometimes even much earlier, such as after less than 1 hour. Even when using amines that have very long curing times, only small amounts of salt (S) are necessary to achieve excellent pull-out strengths after a short time. Because even small amounts of the salt (S) are sufficient as an accelerator, the salt (S) itself has no negative impact on properties relevant to the application, such as the rheological properties of the epoxy resin compound.

The epoxy resin compound is preferably used for construction purposes. The expression "for construction purposes" refers to the structural adhesion of concrete/concrete, steel/concrete or steel/steel or one of said materials with other mineral materials, to the structural strengthening of components made of concrete, brickwork and other mineral materials, to reinforcement applications with fiber-reinforced polymers of building objects, to the chemical fastening of surfaces made of concrete, steel or other mineral materials, in particular the chemical fastening of construction elements and anchoring means, such as anchor rods, anchor bolts, (threaded) rods, (threaded) sleeves, reinforcing bars, screws and the like, in boreholes in various substrates, such as (reinforced) concrete, brickwork, other mineral materials, metals (e.g. steel), ceramics, plastics, glass, and wood.

The epoxy resin compound is preferably a multi-component epoxy resin compound, preferably a two-component epoxy resin compound, which comprises an epoxy resin component (A) and a curing agent component (B). The epoxy resin component (A) comprises at least one curable epoxy resin. The curing agent component (B) comprises at least one amine which is reactive to epoxy groups. In the multi-component epoxy resin compound, the epoxy resin component (A) and the curing agent component (B) are separate from one another so as to prevent a reaction. The salt (S) used as an accelerator can be contained in the epoxy resin component (A) or in the curing agent component (B) or in both the epoxy resin component (A) and the curing agent component (B). It is preferable for the salt (S) to be contained at least in the curing agent component (B). The salt (S) is preferably contained in the curing agent component (B).

According to the invention, the salt (S) is at least one salt selected from the group consisting of salts of nitric acid, salts of nitrous acid, salts of halogens, salts of trifluoromethanesulfonic acid and combinations thereof. The salt (S) is preferably at least one salt selected from the group consisting of salts of nitric acid, salts of halogens, salts of trifluoromethanesulfonic acid and combinations thereof. It has been found to be particularly preferable for the salt (S) to be selected from the group consisting of nitrates ($NO_3^-$), iodides ($I^-$), triflates ($CF_3SO_3^-$) and combinations thereof.

Alkali metal nitrates, alkaline earth metal nitrates, lanthanide nitrates, aluminum nitrate, ammonium nitrate and mixtures thereof are particularly suitable salts of nitric acid. Corresponding salts of nitric acid are commercially available. Alkali metal nitrates and/or alkaline earth metal nitrates, such as $Ca(NO_3)_2$ or $NaNO_3$, are preferably used as salts of nitric acid. It is also possible to use a solution of a salt in nitric acid as the salt (S), for example a solution containing $Ca(NO_3)_2/HNO_3$. To prepare this solution, $CaCO_3$ is dissolved in $HNO_3$.

Alkali metal nitrites, alkaline earth metal nitrites, lanthanide nitrites, aluminum nitrite, ammonium nitrite and mixtures thereof are particularly suitable salts of nitrous acid. Corresponding salts of nitrous acid are commercially available. Alkali metal nitrites and/or alkaline earth metal nitrites, such as $Ca(NO_2)_2$, are preferably used as salts of nitrous acid.

Alkali metal halides, alkaline earth metal halides, lanthanide halides, aluminum halides, ammonium halides and mixtures thereof are particularly suitable salts of halogens. Corresponding salts of halogens are commercially available. The halogens are preferably selected from the group consisting of chloride, bromide, iodide and mixtures thereof, with iodides particularly preferably being used.

Alkali metal triflates, alkaline earth metal triflates, lanthanide triflates, aluminum triflate, ammonium triflate and mixtures thereof are particularly suitable salts of trfluoromethanesulfonic acid. Corresponding salts of trifluoromethanesulfonic acid are commercially available. Alkali metal nitrates and/or alkaline earth metal nitrates, such as $Ca(CF_3SO_3)_2$, are preferably used as salts of trifluoromethanesulfonic acid.

In principle, the cations of the salt (S) can be organic, inorganic or a mixture thereof. The cation of the salt (S) is preferably an inorganic cation.

Suitable organic cations are, for example, ammonium cations substituted with organic groups, such as $C_1$-$C_6$-alkyl groups, such as tetraethylammonium cations.

Suitable inorganic cations of the salt (S) are preferably cations selected from the group consisting of alkali metals, alkaline earth metals, lanthanides, aluminum, ammonium ($NH_4^-$) and mixtures thereof, more preferably from the group consisting of alkali metals, alkaline earth metals, aluminum, ammonium and mixtures thereof, and even more preferably from the group consisting of alkali metals, alkaline earth metals, aluminum and mixtures thereof. It is particularly preferable for the cation of the salt (S) to be selected from the group consisting of sodium, calcium, aluminum, ammonium and mixtures thereof.

The following compounds or components are therefore particularly suitable as the salt (S): $Ca(NO_3)_2$ (calcium nitrate, usually used as $Ca(NO_3)_2$ tetrahydrate), a mixture of $Ca(NO_3)_2/HNO_3$, $KNO_3$ (potassium nitrate), $NaNO_3$ (sodium nitrate), $Mg(NO_3)_2$ (magnesium nitrate, usually used as $Mg(NO_3)_2$ hexahydrate), $Al(NO_3)_3$ (aluminum nitrate, usually used as $Al(NO_3)_3$ nonahydrate), $NH_4NO_3$ (ammonium nitrate), $Ca(NO_2)_2$ (calcium nitrite), NaCl (sodium chloride), NaBr (sodium bromide), NaI (sodium iodide), $Ca(CF_3SO_3)_2$ (calcium triflate), $Mg(CF_3SO_3)_2$ (magnesium triflate), and $Li(CF_3SO_3)_2$ (lithium triflate).

The epoxy resin component and/or the curing agent component can have one or more salts (S). The salts can be used both individually and in a mixture of two or more of the specified salts.

In order to improve the solubility properties of the salt (S) in the epoxy resin component and/or the curing agent component, the salt (S) can be dissolved in a suitable solvent and used accordingly as a solution. Organic solvents such as methanol, ethanol and glycerol, for example, are suitable for this purpose. However, water can also be used as the solvent, possibly also in a mixture with the above-mentioned organic solvents. In order to prepare the corresponding salt solutions, the salt (S) is added to the solvent and stirred, preferably until it is completely dissolved.

The salt (S) is preferably contained in the epoxy resin compound in a proportion of from 0.1 to 4 wt. %, preferably 0.1 to 3 wt. %, based on the total weight of the epoxy resin compound.

In the preferred embodiment in which the salt (S) is contained in the curing agent component, this is preferably contained in the curing agent component in a proportion of from 0.1 to 15 wt. %, based on the total weight of the curing agent component. The salt (S) is preferably contained in the curing agent component in a proportion of from 0.5 to 12 wt. %, more preferably in a proportion of from 1.0 to 10 wt. %, even more preferably in a proportion of from 1.5 to 8.0 wt. %, based on the total weight of the curing agent component.

In the embodiment in which the salt (S) is contained in the epoxy resin component, this is preferably contained in the epoxy resin component in a proportion of from 0.1 to 5 wt. %, based on the total weight of the epoxy resin component. The salt (S) is preferably contained in the epoxy resin component in a proportion of from 0.5 to 4 wt. %, based on the total weight of the epoxy resin component.

The curing agent component (B) of the multi-component epoxy resin compound comprises, as the curing agent, at least one amine which is reactive to epoxy resins. The amine used as the curing agent is a diamine or polyamine selected from the group consisting of aliphatic, alicyclic, aromatic and araliphatic amines and has on average per molecule at least two reactive hydrogen atoms bonded to a nitrogen atom. The amine can be selected from the amines that are conventional for epoxy-amine systems and known to a person skilled in the art.

Examples of suitable amines are given below, without, however restricting the scope of the invention: 1,2-diaminoethane(ethylenediamine), 1,2-propanediamine, 1,3-propanediamine, 1,4-diaminobutane, 2,2-dimethyl-1,3-propanediamine (neopentanediamine), diethylaminopropylamine (DEAPA), 2-methyl-1,5-diaminopentane, 1,3-diaminopentane, 1,3-diaminopentane, 2,2,4- or 2,4,4-trimethyl-1,6-diaminohexane and mixtures thereof (TMD), 1,3-bis(aminomethyl)-cyclohexane (1,3-BAC), 1,2-bis(aminomethyl)cyclohexane (1,2-BAC), hexamethylenediamine (HMD), 1,2- and 1,4-diaminocyclohexane (1,2-DACH and 1,4-DACH), bis(4-aminocyclohexyl)methane (PACM), bis(4-amino-3-methylcyclohexyl)methane, diethylenetriamine (DETA), 4-azaheptane-1,7-diamine, 1,11-diamino-3,6,9-trioxundecane, 1,8-diamino-3,6-dioxaoctane, 1,5-diaminomethyl-3-azapentane, 1,10-diamino-4,7-dioxadecane, bis(3-aminopropyl)amine, 1,13-diamino-4,7,10-trioxatridecane, 4-aminomethyl-1,8-diaminooctane, 2-butyl-2-ethyl-1,5-diaminopentane, N,N-bis(3-aminopropyl)methylamine, triethylenetetramine (TETA), tetraethylenepentamine (TEPA), pentaethylenehexamine (PEHA), 1,3-benzenedimethanamine (m-xylylenediamine, mXDA), 1,4-benzenedimethanamine (p-xylylenediamine, pXDA), 5-(aminomethyl)bicyclo[[2.2.1]hept-2-yl]methylamine (NBDA, norbomane diamine), dimethyldipropylenetramine, dimethylaminopropylaminopropylamine (DMAPAPA), 3-aminomethyl-3,5,5-trimethylcyclohexylamine (isophorone diamine (IPDA)), diaminodicyclohexyl methane (PACM), diethylmethylbenzenediamine (DETDA), 4,4'-diaminodiphenylsulfone (dapsone), mixed polycyclic amines (MPCA) (e.g. Ancamine 2168), dimethyldiaminodicyclohexylmethane (Laromin C260), 2,2-bis(4-aminocyclohexyl)propane, (3(4),8(9)bis (aminomethyldicyclo[5.2.1.0$^{2.6}$]decane (mixture of isomers, tricyclic primary amines; TCD-diamine), 4-methylcyclohexyl diamine (mCDA). N,N'-diaminopropyl-2-methyl-cyclohexane-1,3-diamine, N,N'-diaminopropyl-4-methyl-cyclohexane-1,3-diamine, N-(3-aminopropyl)cyclohexyl amine, and 2-(2,2,6,6-tetramethylpiperidin-4-yl)propane-1,3-diamine.

Preferred amines in the curing agent component are polyamines, such as 2-methylpentanediamine (DYTEK A), 3-aminomethyl-3,5,5-trimethylcyclohexane (IPDA), 1,3-benzenedimethanamine (m-xylylenediamine, mXDA), 4,4'-methylenebis(cyclohexyl-amine) (PACM), 1,4-benzenedimethanamine (p-xylylenediamine, PXDA), 1,6-diamino-2, 2,4-trimethylhexane (TMD), diethylenetriamine (DETA), triethylenetetramine (TETA), tetraethylenepentamine (TEPA), pentaethylenehexamine (PEHA), N-ethylaminopiperazine (N-EAP), (3(4),8(9)bis(aminomethyl)dicyclo [5.2.1.0$^{2.6}$]decane (mixture of isomers, tricyclic primary amines; TCD-diamine), 1,14-diamino-4,11-dioxatetradecane, dipropylenetriamine, 2-methyl-1,5-pentanediamine, N,N'-dicyclohexyl-1,6-hexanediamine, N, N'-dimethyl-1,3-diaminopropane, N,N'-diethyl-1,3-diaminopropane, N,N-dimethyl-1,3-diaminopropane, secondary polyoxypropylenedi- and triamines, 2,5-diamino-2,5-dimethylhexane, bis (amino-methyl)tricyclopentadiene, 1,8-diamino-p-menthane, bis(4-amino-3,5-dimethylcyclohexyl)methane, 1,3-bis(aminomethyl)cyclohexane (1,3-BAC), 1,2-bis(aminomethyl)cyclohexane (1,2-BAC), dipentylamine, N-2-(aminoethyl)piperazine (N-AEP), N-3-(aminopropyl)piperazine, piperazine and methylcyclohexyl diamine (mCDA), N,N'-diaminopropyl-2-methyl-cyclohexane-1,3-diamine, N,N'-diaminopropyl-4-methyl-cyclohexane-1,3-diamine, N-(3-aminopropyl)cyclohexylamine, and 2-(2,2,6,6-tetramethylpiperidin-4-yl)propane-1,3-diamine.

The amine reactive to epoxy groups is preferably selected from 3-aminomethyl-3,5,5-trimethylcyclohexane (IPDA), 2-methyl-1,5-pentanediamine (DYTEK A), m-xylylenediamine (mXDA), 1,3-bis(aminomethyl)-cyclohexane (1,3-BAC), 1,2-bis(aminomethyl)cyclohexane (1,2-BAC), 4,4'-methylenebis(cyclohexyl-amine) (PACM), 4-methylcyclohexyl-diamine (mCDA) and mixtures thereof. In particular, the salt (S) is used in a curing agent component which comprises aminomethyl-3,5,5-trimethylcyclohexane.

The amines can be used both individually and in a mixture of two or more of the specified amines.

The amine which is reactive to epoxy groups is preferably contained in the curing agent component in a proportion of from 10 to 90 wt. %, particularly preferably from 35 to 60 wt. %, based on the total weight of the curing agent component.

The curing agent component can comprise further additives from the group of solvents, further phenolic accelerants, co-accelerants, adhesion promoters and inorganic fillers.

Non-reactive diluents (solvents) may preferably be contained in amount of up to 30 wt. %, based on the total weight of the curing agent component, for example from 1 to 20 wt. %. Examples of suitable solvents are alcohols, such as methanol, ethanol or glycols, lower alkyl ketones such as acetone, di lower alkyl lower alkanoyl amides such as dimethylacetamide, lower alkyl benzenes such as xylenes or toluene, phthalic acid esters or paraffins. The amount of solvents is preferably ≤5 wt. %, based on the total weight of the curing agent component.

The phenolic accelerants are preferably selected from salicylic acid, styrenated phenols and cardanol, and mixtures thereof. These may be present in the curing agent component in a proportion of from 0 to 10 wt. %, based on the total weight of the curing agent component.

Benzene alcohol, tertiary amines, novolac resins, imidazoles or tertiary aminophenols, organophosphines, Lewis bases or acids such as phosphoric acid esters, or mixtures of two or more thereof, can be used as co-accelerators, for example. The co-accelerators are preferably contained in the curing agent component in a weight proportion of from 0.001 to 5 wt. %, based on the total weight of the curing agent component.

Examples of suitable co-accelerators are in particular tris-2,4,6-dimethylaminomethylphenol, 2,4,6-tris(dimethylamino)phenol and bis[(dimethylamino)methyl]phenol. A suitable co-accelerator mixture contains 2,4,6-tris(dimethylaminomethyl)phenol and bis(dimethylaminomethyl)phenol. Mixtures of this kind are commercially available, for example as Ancamine® K54 (Evonik, Germany).

By using an adhesion promoter, the cross-linking of the borehole wall with the mortar compound is improved such that the adhesion increases in the cured state. Suitable adhesion promoters are selected from the group of silanes that have at least one Si-bound hydrolyzable group, such as 3-glycidoxypropyltimethoxysilane, 3-glycidoxypropyltriethoxysilane, 2-(3,4-epoxycyclohexyl)ethyltimethoxysilane, N-2-(aminoethyl)-3-aminopropylmethyl-diethoxysilane, N-2-(aminoethyl)-3-aminopropyl-triethoxysilane, 3-aminopropyl-trimethoxysilane, 3-aminopropyltriethoxysilane, N-phenyl-3-aminoethyl-3-aminopropyl-trimethoxysilane, 3-mercaptopropyltrimethoxysilane and 3-mercaptopropylmethyldimethoxysilane. In particular, 3-aminopropyltrimethoxysilane (AMMO), 3-aminopropyltriethoxysilane (AMEO), 2-aminoethyl-3-aminopropyl-trimethoxysilane (DAMO) and trimethoxysilylpropyldiethylenetetramine (TRIAMO) are preferred as adhesion promoters. Further silanes are described, for example, in EP3000792 A1, the content of which is hereby incorporated in the present application.

The adhesion promoter can be contained in an amount of up to 10 wt. %, preferably from 0.1 to 5 wt. %, more preferably from 1.0 to 2.5 wt. %, based on the total weight of the curing agent component.

Inorganic fillers, in particular cements such as Portland cement or aluminate cement and other hydraulically setting inorganic substances, quartz, glass, corundum, porcelain, earthenware, baryte, light spar, gypsum, talc and/or chalk and mixtures thereof are used as fillers. In addition, thickeners such as fumed silica can also be used as an inorganic filler. Particularly suitable fillers are quartz powders, fine quartz powders and ultra-fine quartz powders that have not been surface-treated, such as Millisil W3, Millisil WB, Millisil W8 and Millisil W12, preferably Millisil W12. Silanized quartz powders, fine quartz powders and ultra-fine quartz powders can also be used. These are commercially available, for example, from the Silbond product series from Quarzwerke. The product series Silbond EST (modified with epoxysilane) and Silbond AST (treated with aminosilane) are particularly preferred. Furthermore, it is possible for fillers based on aluminum oxide such as aluminum oxide ultra-fine fillers of the ASFP type from Denka, Japan ($d_{50}$=0.3 µm) or grades such as DAW or DAM with the type designations 45 ($d_{50}$<0.44 µm), 07 ($d_{50}$>8.4 µm), 05 ($d_{50}$<5.5 µm) and 03 ($d_{50}$<4.1 µm). Moreover surface-treated fine and ultra-fine fillers of the Aktisil AM type (treated with aminosilane, $d_{50}$=2.2 µm) and Aktisil EM (treated with epoxysilane, $d_{50}$=2.2 µm) from Hoffman Mineral can be used.

The inorganic fillers can be added in the form of sands, flours, or molded bodies, preferably in the form of fibers or balls. The fillers may also be present in one or all components of the multi-component mortar compound. A suitable selection of the fillers with regard to type and particle size distribution/(fiber) length can be used to control properties relevant to the application, such as rheological behavior, press-out forces, internal strength, tensile strength, pull-out forces and impact strength.

The proportion of fillers is preferably from 0 to 75 wt. %, for example from 10 to 75 wt. %, preferably from 15 to 75 wt. %, more preferably from 20 to 50 wt. %, and even more preferably from 25 to 40 wt. %, based on the total weight of the curing agent component.

The epoxy resin component (A) preferably comprises at least one curable epoxy resin. A large number of the compounds known to a person skilled in the art and commercially available for this purpose, which contain on average more than one epoxy group, preferably two epoxy groups, per molecule can be used as a curable epoxy in the epoxy resin component (A). These epoxy resins may be both saturated and unsaturated as well as aliphatic, alicyclic, aromatic or heterocyclic, and may also have hydroxyl groups. They may also contain substituents which do not cause disruptive secondary reactions under the mixing or reaction conditions, for example alkyl or aryl substituents, ether groups and the like. Trimeric and tetrameric epoxies are also suitable in the context of the invention.

The epoxy resins are preferably glycidyl ethers which are derived from polyhydric alcohols, in particular from polyhydric phenols such as bisphenols and novolacs, in particular those having an average glycidyl group functionality of 1.5 or greater, in particular 2 or greater, for example from 2 to 10.

The epoxy resins can have an epoxy equivalent weight (EEW) of from 120 to 2000 g/EQ, preferably from 140 to 400, in particular from 155 to 195, for example from 165 to 185. Mixtures of a plurality of epoxy resins may also be used.

Examples of the polyhydric phenols used to prepare the epoxy resins are resorcinol, hydroquinone, 2,2-bis-(4-hydroxyphenyl)propane (bisphenol A), isomer mixtures of dihydroxyphenylmethane (bisphenol F), tetrabromobisphenol A, novolacs, 4,4'-dihydroxyphenylcyclohexane and 4,4'-dihydroxy-3,3'-dimethyldiphenylpropane.

The epoxy resin is preferably a diglycidyl ether of bisphenol A or bisphenol F or a mixture thereof. Liquid diglycidyl ethers based on bisphenol A and/or F having an EEW of from 180 to 190 g/EQ are particularly preferably used.

Further examples are hexanediol diglycidyl ether, trimethylolpropane triglycidyl ether, bisphenol A epichlorohydrin resins and/or bisphenol F epichlorohydrin resins, for example having an average molecular weight of Mn≤2000 g/mol.

The proportion of epoxy resin is >0 to 100 wt. %, preferably 10 to 70 wt. % and particularly preferably 30 to 60 wt. %, based on the total weight of the epoxy resin component (A).

In addition to the epoxy resins, the epoxy resin component (A) may optionally contain at least one reactive diluent. Glycidyl ethers of aliphatic, alicyclic or aromatic monoalcohols or in particular polyalcohols having a lower viscosity than epoxies containing aromatic groups are used as reactive diluents. Examples of reactive diluents are monoglycidyl ethers, e.g. o-cresyl glycidyl ether, and glycidyl ethers having an epoxy functionality of at least 2, such as 1,4-butanediol diglycidyl ether (BDDGE), cyclohexanedimethanol diglycidyl ether and hexanediol diglycidyl ether, as well as tri- or higher glycidyl ethers, such as glycerol triglycidyl ether, pentaerythritol tetraglycidyl ether, trimethylolpropane triglycidyl ether (TMPTGE), or trimethylolethane triglycidyl ether (TMETGE), with trimethylolethane triglycidyl ether being preferred. Mixtures of two or more of these reactive diluents can also be used, preferably mixtures containing triglycidyl ethers, particularly preferably as a mixture of 1,4-butanediol diglycidyl ether (BDDGE) and trimethylolpropane triglycidyl ether (TMPTGE) or 1,4-butanediol diglycidyl ether (BDDGE) and trimethylolethane triglycidyl ether (TMETGE).

The reactive diluents are preferably present in an amount of from 0 to 60 wt. %, in particular from 1 to 20 wt. %, based on the total weight of the resin component (A).

The proportion of the epoxy component (A) in the total mass of the multi-component mortar compound is preferably 5 to 90 wt. %, in particular 20 to 80 wt. %, 30 to 70 wt. % or 40 to 60 wt. %.

Suitable epoxy resins and reactive diluents can also be found in the standard reference from Michael Dombusch, Ulrich Christ and Rob Rasing, "Epoxidharze," Vincentz Network GmbH & Co. KG (2015), ISBN 13: 9783866308770. These compounds are included here by reference.

Furthermore, the epoxy resin component (A) can contain conventional additives, in particular adhesion promoters and fillers, as already described for the curing agent component.

The adhesion promoter can be contained in an amount of up to 10 wt. %, preferably from 0.1 to 5 wt. %, particularly preferably from 1.0 to 5.0 wt. %, based on the total weight of the epoxy resin component (A).

The proportion of fillers is preferably from 0 to 75 wt. %, for example from 10 to 75 wt. %, preferably from 15 to 75 wt. %, more preferably from 20 to 50 wt. %, and even more preferably from 25 to 40 wt. %, based on the total weight of the epoxy resin component (A).

Further conceivable additives to the multi-component epoxy resin compound are also thixotropic agents such as optionally organically after-treated fumed silica, bentonites, alkyl- and methylcelluloses and castor oil derivatives, plasticizers such as phthalic or sebacic acid esters, stabilizers, antistatic agents, thickeners, flexibilizers, curing catalysts, rheology aids, wetting agents, coloring additives such as dyes or pigments, for example for different staining of components for improved control of their mixing, as well as wetting agents, desensitizing agents, dispersants and other control agents for the reaction rate, or mixtures of two or more thereof.

The multi-component epoxy resin compound is preferably present in cartridges or film pouches which comprise two or more separate chambers in which the epoxy resin component (A) and the curing agent component (B) of the mortar compound are separately arranged so as to prevent a reaction.

In the use as intended, the epoxy resin component (A) and the curing agent component (B) are discharged out of the separate chambers and mixed in a suitable device, for example a static mixer or dissolver. The mixture of epoxy resin component (A) and curing agent component (B) is then introduced into the previously cleaned borehole by means of a known injection device. The component to be fastened is then inserted into the mortar compound and aligned. The reactive constituents of the curing agent component (B) react with the epoxy resin of the resin component (A) by polyaddition such that the epoxy resin compound cures under environmental conditions within a desired period of time, preferably within minutes or hours.

Components A and B are preferably mixed in a ratio that results in a balanced stoichiometry according to the EEW and AHEW values.

The AHEW value (amine hydrogen equivalent weight, H equivalent) provides the amount of the curing agent component which contains 1 mol of reactive H. The AHEW is determined in a manner known to a person skilled in the art on the basis of the formulation of the reaction mixture from the known H equivalents of the used reactants and raw materials from which they are calculated.

Using the example of meta-xylylenediamine ($M_w$=136 g/mol, functionality=4 eq/mol), the calculation of the AHEW is explained below by way of example:

$$\text{General formula } AHEW = \frac{Mw}{\text{Functionality}} = \frac{136}{4}\left[\frac{g}{eq}\right] = 34\left[\frac{g}{eq}\right]$$

The EEW (epoxide equivalent weight, epoxide equivalent values) are generally provided by the manufacturers of the epoxy resin components used in each case or are calculated according to known methods. The EEW values provide the amount in g of epoxy resin which contains 1 mol of epoxy groups.

Experimentally, the AHEW was obtained by determining the glass transition temperature (Tg) from a mixture of epoxy resin (with known EEW) and an amine component. In this case, the glass transition temperatures of epoxy resin/amine mixtures were determined with different ratios. The sample was cooled at a heating rate of −20 K/min from 21 to −70° C., heated in a first heating cycle to 250° C. (heating rate 10 K/min), then re-cooled to −70° C. (heating rate −20 K/min) and heated (20 K/min) to 200° C. in the last step. The mixture having the highest glass transition temperature in the second heating cycle ("$T_g2$") has the optimum ratio of epoxy resin and amine. The AHEW value can be calculated from the known EEW and the optimum epoxy resin/amine ratio.

Example: EEW=158 g/mol

Amine/epoxy resin mixture having a maximum $T_g2$:1 g amine with 4.65 g epoxy resin $$AHEW = \frac{1}{4.65} \cdot 158 = 34\left[\frac{g}{eq}\right]$$

The present invention also relates to a method for the chemical fastening of construction elements and/or anchoring means in boreholes, a multi-component epoxy resin compound as described above being used for the chemical fastening of the construction elements. The method according to the invention is particularly suitable for the structural adhesion of concrete/concrete, steel/concrete or steel/steel or one of said materials with other mineral materials, for the structural strengthening of components made of concrete, brickwork and other mineral materials, for reinforcement applications with fiber-reinforced polymers of building objects, for the chemical fastening of surfaces made of concrete, steel or other mineral materials, in particular the chemical fastening of construction elements and anchoring means, such as anchor rods, anchor bolts, (threaded) rods, (threaded) sleeves, reinforcing bars, screws and the like, in boreholes in various substrates, such as (reinforced) concrete, brickwork, other mineral materials, metals (e.g. steel), ceramics, plastics, glass, and wood. The method according to the invention is very particularly preferably used for the chemical fastening of anchoring means.

Where applicable, the above statements regarding the use according to the invention apply equally to the method according to the invention.

Further advantages of the invention can be found in the following description of preferred embodiments, which are not understood to be in any way limiting, however. All embodiments of the invention can be combined with one another within the scope of the invention.

EXAMPLES

The chemicals listed in table 1 below have been used to illustrate the examples:

TABLE 1

List of chemicals used

| Substance | Trade name | CAS number | Manufacturer | Country |
|---|---|---|---|---|
| 1,2,3-propanetriol | Gycerol | 56-81-5 | Merck | G |
| 1,2-diaminocyclohexane | Dytek DCH-99 | 694-83-7 | Invista | NL |
| 1,3-cyclohexanedimethanamine | 1,3-BAC | 2579-20-5 | Itochu Deutschland | G |
| 1,3-dihydroxybenzene | Resorcinol | 108-46-3 | Sigma-Aldrich | G |
| 2,4,6-tris(dimethylaminomethyl)phenol, bis[(dimethylamino)methyl]phenol | Ancamine K54 | 90-72-2, 71074-89-0 | Air Products | NL |
| 2-methyl-1,5-pentamethylene diamine | Dytek A | 15520-10-2 | Invista | NL |
| 4,4'-methylenebis(2-methyl-cyclohexylamine) | MACM | 6864-37-5 | Sigma-Aldrich | G |
| Aluminum nitrate nonahydrate | Aluminum nitrate | 7784-27-2 | Sidma-Aldrich | G |
| Ammonium nitrate | Ammonium nitrate | 6484-52-2 | Sigma-Aldrich | G |
| Calcium Carbonate | Calcium carbonate | 471-34-1 | Sigma-Aldrich | G |
| Calcium nitrate tetrahydrate | Calcium nitrate | 13477-34-4 | Sigma-Aldrich | G |
| Calcium nitrite solution, 30% | Calcium nitrate solution, 30% in water | 13780-06-8 | Sigma-Aldrich | G |
| Calcium oxide | Calcium oxide | 1305-78-8 | Sigma-Aldrich | G |
| Calcium propionate | Calcium propionate | 4075-81-4 | Sigma-Aldrich | G |
| Calcium sulfate dihydrate | Calcium sulfate dihydrate 75 | 10101-41-1 | Hilliges Gipswerk | G |
| Calcium trifluoromethanesulfonate | Calcium triflate | 55120-75-7 | Sigma-Aldrich | G |
| Isophorone diamine | Vestamin IPD | 2855-13-2 | Evonik Degussa | G |
| Potassium nitrate | Potassium nitrate | 7757-79-1 | Sigma-Aldrich | G |
| Potassium sulfate | Potassium sulfate | 7778-80-5 | Sigma-Aldrich | G |
| Lithium hydroxide | Lithium hydroxide | 1310-65-2 | Sigma-Aldrich | G |
| Lithium trifluoromethanesulfonate | Lithium triflate | 33454-82-9 | TCI Europe | B |
| Magnesium nitrate | Magnesium nitrate hexahydrate | 13446-18-9 | Sigma-Aldrich | G |
| Magnesium trifluoromethanesulfonate | Magnesium triflate | 60871-83-2 | Alfa Aesar | G |
| m-Xylylenediamine | mXDA | 1477-55-0 | ltochu Deutschland | G |
| Sodium bromide | Sodium bromide | 7647-15-6 | Sigma-Aldrich | G |
| Sodium chloride | Sodium chloride | 7647-14-5 | | G |
| Sodium iodide | Sodium iodide | 7681-82-5 | Sigma-Aldrich | G |
| Sodium nitrate | Chile-Salpeter | 7631-99-4 | Sigma-Aldrich | G |
| 4-hydroxyphenylacetic acid | 4-hydroxyphenylacetic acid | 156-38-7 | TCI Europe | B |
| Phenol novolac resin | Phenolite TD-2131 | 9003-35-4 | DIC Europe | G |
| p-Toluenesulfonic acid monohydrate | p-Toluenesulfonic acid | 6192-52-5 | TCI Europe | B |
| Salicylic acid | Salicylic acid | 69-72-7 | Merck | G |
| Nitric acid 70% | Nitric acid | 7697-37-2 | Sigma-Aldrich | G |
| Styrenated phenol | Novares LS 500 | 61788-44-1 | Rütgers Novares GmbH | G |
| Tetrabutylammonium nitrate | Tetrabutylammonium nitrate | 1941-27-1 | Sigma-Aldrich | G |
| Trifluoroacetic acid | Trifluoroacetic acid | 76-05-1 | TCI Europe | B |

1. Determination of the reaction kinetics by temperature measurement

Epoxy resin component (A)

In the examples, the bisphenol A-based and bisphenol F-based epoxy resins commercially available under the names Araldite GY 240 and Araldite GY 282 (Huntsman), respectively, were used as the epoxy resins.

The 1,4-butanediol-diglycidyl ether and trimethyolpropane-triglycidyl ether commercially available under the names Araldite DY-026 and AralditeTM DY-T (Huntsman), respectively, were used as the reactive diluents.

An epoxy resin component (A) composed as specified in table 2 below was prepared. The components were mixed and stirred in the dissolver (PC laboratory system, volume 1L) at a negative pressure of 80 mbar for 10 minutes at 3500 rpm.

TABLE 2

Composition of epoxy resin component (A)

| Substance | Function | Percent by weight |
|---|---|---|
| Bisphenol A-based epoxy resin | Epoxy resin | 52 |
| Bisphenol F-based epoxy resin | Epoxy resin | 28 |
| 1,4-butanediol-diglycidyl ether | Reactive diluent | 10 |
| Trimethylolpropane triglycidyl ether | Reactive diluent | 10 |
| EEW [g/Eq] | | 158 |

Curing agent component (B)

The amine isophorone diamine (IPDA, trade name Vestamin IPD) from Evonik Degussa, Germany was used as the curing agent component (B). To prepare the curing agent component (B), the amount of salt (8) specified in table 3 was added to IPDA and dissolved as far as possible. This mixture was used as the curing agent component. The mixing ratios were calculated based on the AHEW content of IPDA (42.6 g/EQ), the accelerator content and the EEW content of the epoxy resin component (A).

To determine the reaction kinetics by temperature measurement, the epoxy resin component (A) together with the curing agent component was poured into a 20-ml rolled-rim glass. A temperature sensor was placed in the center of the rolled-rim glass. The temperature change was recorded (device: Yokogawa, DAQ station, model: DX1006-3-4-2). With this method, the curing of the mortar could be followed over the course of the temperature development. If there was an acceleration during curing, the maximum temperature is shifted to shorter times, associated with a higher temperature. $T_{max}$ (maximum temperature reached) and $t_{Tmax}$ (time after which the maximum temperature was reached) were measured.

The results of the determination of the reaction kinetics by temperature measurement for different salts (S) as accelerators are shown in table 3 below.

For comparison, the reaction kinetics by temperature measurement were carried out for numerous accelerators which are known from the prior art. The results of this measurement are shown in table 4 below.

TABLE 4

Results of the determination of the reaction kinetics by temperature measurement for different accelerators (comparative examples)

| Accelerator | Concentration [wt.%] | $T_{max}$ [° C.] | $t_{max}$ [hh:mm:ss] |
|---|---|---|---|
| — | | 36.8 | 02:17:03 |
| H$_2$O | 5 | 65.5 | 01:18:12 |
| | 10 | 86.8 | 00:36:45 |
| Resorcinol | 10 | 81 | 01:18:20 |
| | 20 | 172 | 00:27:48 |
| Glycerol | 5 | 24 | 04:55:38 |
| | 10 | 32 | 02:15:26 |
| Calcium oxide | 2 | 23 | 05:04:05 |
| | 5 | 27 | 00:51:02 |
| Phenolacetic acid | 5 | 28 | 00:23:14 |
| | 10 | 23 | 00:16:37 |
| Styrenated phenol | 10 | 27 | 03:06:47 |
| 'LS 500' | 20 | 29 | 02:28:30 |
| p-Toluenesulfonic acid | 2 | 26 | 03:02:25 |
| | 5 | 25 | 03:04:48 |
| Ancamin K54 | 2 | 25 | 03:57:52 |
| | 5 | 24 | 05:34:45 |
| Salicylic acid | 2 | 32 | 01:16:25 |
| | 5 | 36 | 01:30:38 |
| Phenolite TD-2131 | 15 | 165 | 00:54:23 |
| | 25 | 147 | 00:38:37 |

TABLE 3

Results of the determination of the reaction kinetics

| Salt (S) | Proportion [wt. %] | $T_{max}$ [° C.] | $t_{max}$ [hh:mm:ss] |
|---|---|---|---|
| Calcium nitrate tetrahydrate | 2 | 193 | 00:29:13 |
| | 5 | 189 | 00:12:34 |
| Calcium nitate tetrahydrate/Ancamin K54 | 2/2 | 85 | 00:12:05 |
| Cacium nitrate tetrahydrate/Calcium triflate/Ancamin K54 | 2/2/2 | 111 | 00:07:34 |
| Calcium nitrate/nitric acid solution | 2 | 159 | 00:20:26 |
| | 5 | 176 | 00:09:32 |
| Potassium nitrate (25.0% in H$_2$O) | 8 | 153.2 | 00:43:50 |
| | 20 | 145.8 | 00:19:25 |
| Sodium nitrate (46.0% in H$_2$O) | 4.3 | 125.2 | 01:10:58 |
| | 10.7 | 135.1 | 00:38:06 |
| Magnesium nitrate hexahydrate | 2 | 36 | 01:12:52 |
| | 5 | 152 | 00:38:21 |
| Aluminum nitrate nonahydrate | 2 | 55 | 01:11:33 |
| | 5 | 169 | 00:38:52 |
| Ammonium nitrate | 2 | 173.3 | 00:39:11 |
| | 5 | 195.9 | 00:19:40 |
| Calcium nitrite (33.0% in H$_2$O) | 6.7 | 207 | 00:12:53 |
| | 16.7 | 164.7 | 00:06:41 |
| Sodium chloride (26.4% in H$_2$O) | 7.6 | 130 | 00:43:56 |
| | 18.9 | 157.7 | 00:27:29 |
| Sodium bromide (47.56% in H$_2$O) | 4.2 | 157.2 | 00:47:22 |
| | 10.5 | 145.8 | 00:29:37 |
| Sodium iodide | 2 | 135 | 01:13:03 |
| | 5 | 152 | 00:24:46 |
| Calcium triflate | 2 | 212 | 00:21:49 |
| | 5 | 230 | 00:07:05 |
| Calcium triflate/Ancamine K54 | 2.2 | 141 | 00:16:53 |
| Magnesium triflate | 2 | 46.2 | 02:34:25 |
| | 5 | 100.5 | 01:35:59 |
| Lithium triflate | 2 | 183.5 | 00:34:48 |
| | 5 | 222.6 | 00:14:56 |

TABLE 4-continued

Results of the determination of the reaction kinetics by temperature measurement for different accelerators (comparative examples)

| Accelerator | Concentration [wt.%] | $T_{max}$ [° C.] | $t_{max}$ [hh:mm:ss] |
|---|---|---|---|
| Trifluoroacetic acid | 2 | 31 | 01:47:13 |
| | 5 | 73 | 01:22:20 |
| Lithium hydroxide | 2 | 23 | 00:17:00 |
| | 5 | 23 | 05:21:27 |
| Potassium sulfate | 2 | 45.4 | 03:07:59 |
| | 5 | 46.8 | 02:29:52 |
| Calcium sulfate | 2 | 25 | 05:14:48 |
| | 5 | 24 | 04:41:34 |
| Calcium propionate | 2 | 36.5 | 03:26:25 |
| | 5 | 41.5 | 03:22:06 |
| Tetrabutylammonium nitrate | 2 | 43 | 02:21:04 |
| | 5 | 38 | 02:27:56 |
| Potassium sulfate (10.02% in H$_2$O) | 20.0 | 136.9 | 00:17:50 |
| | 49.9 | 98.2 | 00:12:12 |

Variation of the amine in the curing aqent component

The curing agent component (B) was modified in that the amine IPDA was replaced by the amines listed in table 5 below and combined with the salts (S) specified in each case. The results of the determination of the reaction kinetics by temperature measurement are given in tables 5 (according to the invention) and 6 (comparative examples) below.

TABLE 5

Results of the determination of the reaction kinetics by temperature measurement with variation of the amine in the curing agent component

| Amine | Salt (S) | Proportion | $T_{max}$ [° C.] | $t_{max}$ [hh:mm:ss] |
|---|---|---|---|---|
| 1,3-BAC | Calcium nitrate tetrahydrate | 2 | 165 | 00:11:45 |
| 1,3-BAC | Calcium nitrate tetrahydrate in glycerol (80% solution) | 2.5 | 257.5 | 00:13:20 |
| MACM | Calcium nitrate tetrahydrate | 2 | 61 | 00:55:29 |
| Dytek A | Calcium nitrate tetrahydrate in glycerol (80% solution) | 2.5 | 226.5 | 00:15:32 |
| 1,2-BAC | Calcium triflate | 2 | 146.5 | 01:14:13 |
| mXDA | Sodium iodide in glycerol (36.4% solution) | 5.5 | 239.0 | 00:40:52 |

TABLE 6

Results of the determination of the reaction kinetics by temperature measurement with variation of the amine in the curing agent component using a novolac accelerator

| Amines | Accelerator | Concentration [%] | Tmax [°C,] | tnnax [hh:mm:ss] |
|---|---|---|---|---|
| 1,3-BAC | — | | 33 | 03:03:35 |
| MACM | — | | 22 | 03:12:37 |
| mAcm | Phenolite TD-2131 | 15 | 50 | 01:20:40 |
| Dytek A | Phenolite TD-2131 | 15 | 222.7 | 00:33:17 |
| 1,2-BAC | Phenolite TD-2131 | 15 | 57.1 | 01:25:53 |
| 1,3-BAC | Phenolite TD-2131 | 15 | 209.5 | 00:25:07 |
| mXDA | Phenolite TD-2131 | 15 | 224.9 | 00:38:46 |

2. Mortar compounds and pull-out tests
Epoxy resin component (A)

In the examples, the bisphenol A-based and bisphenol F-based epoxy resins commercially available under the names Araldite GY 240 and Araldite GY 282 (Huntsman), respectively, were used as the epoxy resins.

The 1,4-butanediol-diglycidyl ether and trimethylolpropane-triglycidyl ether commercially available under the names Araldite DY-026 and Araldite™ DY-T (Huntsman), respectively, were used as the reactive diluents.

3-glycidyloxypropyl-trimethoxysysilane available under the name Dynalsylan GLYMO™ (Evonik Industries) was used as the adhesion promoter.

The liquid components were premixed by hand. Subsequently, quartz (Millisil™ W12 from Quarzwerke Frechen) was added as a filler and fumed silica (Cab-O-Sil™ TS-720 from Cabot Rheinfelden) was added as a thickener and the mixture was stirred in the dissolver (PC laboratory system, volume 1L) for 10 minutes at a negative pressure of 80 mbar at 3500 rpm.

The composition of the epoxy resin component (A) used in the examples is given in table 7 below.

TABLE 7

Composition of the epoxy resin umponent (A) in wt,%

| Substance | Function | Percent by weight [wt,%] |
|---|---|---|
| 3-glycidyloxypropyl-trimethoxysysilane | Adhesion promoter | 2.8 |
| Bisphenol A-based epoxy resin | Epoxy resin | 31.3 |
| Bisphenol F-based epoxy resin | Epoxy resin | 16.9 |
| 1,4-butanediol-diglycidyl ether | Reactive diluent | 6.0 |
| Trimethyolpropane-trigiycidyl ether | Reactive diluent | 6.0 |
| Quartz | Filler | 34.4 |
| Silicic acid | Thickener | 2.7 |
| EEW [g/Eq] | | 255 |

Curing agent component (B)
Starting materials

Isophorone diamine (IPDA) from Evonik Degussa, Germany, 1,3-cyclohexanedimethanamine (1,3-BAC) and m-xylylenediamine (mXDA) from MGC, Japan and 2-methlypentamethylenediamine (Dytek A) from Invista, the Netherlands, were used as amines for preparing the curing agent component (B).

Quartz (Millisil™ W12 from Quarzwerke Frechen) and calcium aluminate cement (Secar 80 from Kemeos SA) were used as a filler and fumed silica (Cab-O-Sil™ TS-720 from Cabot Rheinfelden) was used as a thickener.

The salts calcium nitrate and sodium iodide were used as solutions in glycerol (1,2,3-propanetriol, CAS No. 56-81-5, Merck, G). To prepare the calcium nitrate solution, 400.0 g calcium nitrate tetrahydrate was added to 100.0 g glycerol and stirred at 50° C. until completely dissolved (approx. 3 hours). The solution prepared in this way contained 80.0% calcium nitrate tetrahydrate. To prepare the sodium iodide solution, 36.4 g sodium iodide was added to 63.6 glycerol and stirred at 50° C. until completely dissolved. The solution prepared in this way contained 36.4% sodium iodide.

Calcium triflate was dissolved as a solid in the amine of the particular curing agent.

A calcium nitrate/nitric acid solution was also used as the salt (S). To prepare this solution, 52.6 g calcium carbonate was slowly added to 135.2 g nitric acid and then stirred for 5 minutes.

The liquid components were mixed to prepare the curing agent components (B). The accelerator was added and quartz powder and silicic acid were then added and stirred in the dissolver (PC laboratory system, volume 1 L) for 10 minutes at a negative pressure of 80 mbar at 2500 rpm.

The composition of the curing agent components (B) prepared in this way is specified in tables 8 (according to the invention) and 9 (comparative examples) below:

TABLE 8

Composition of the curing agent component (B) in wt.%

| | Example | 1 | 2 | 3 | 4 |
|---|---|---|---|---|---|
| Amine | 1,3-BAC | 36.75 | — | — | — |
| | mXDA | — | 41.2 | — | — |
| | IPDA | — | — | 42.0 | — |
| | DYTEK A | — | — | — | 42.0 |
| Accelerator | Sodium iodide | 8.25 | — | — | — |
| | Calcium nitrate | — | 3.3 | — | — |
| | Calcium nitrate/nitric acid | — | — | 3.0 | — |
| | Calcium inflate | — | — | — | 3.0 |
| | Quailz | 25.0 | 25.0 | 25.0 | 25.0 |
| | Calcium aluminate cement | 25.0 | 25.0 | 25.0 | 25.0 |
| | Thickener | 5.0 | 5.0 | 5.0 | 5.0 |
| | AHEW [g/Eq] | 97 | 83 | 101 | 69 |

TABLE 9

Composition of the curing agent component (B) of comparative examples 1 to 5 in wt. %

| | Example | 1 | 2 | 3 | 4 | 5 |
|---|---|---|---|---|---|---|
| Amine | 1,3-BAC | 36.6 | — | — | — | — |
| | mXDA | — | 36.6 | — | — | — |
| | IPDA | — | — | 27.6 | 36.6 | — |
| | DYTEK A | — | — | — | — | 36.6 |
| Accelerator | Phenolite TD-2131 | 6.0 | 6.0 | — | 6.0 | 6.0 |
| | Ancamine K54 | 2.4 | 2.4 | 2.4 | 2.4 | 2.4 |
| | Novares LS 500 | — | — | 15.0 | — | — |
| | Quartz | 25.0 | 25.0 | 25.0 | 25.0 | 25.0 |
| | Calcium aluminate cement | 25.0 | 25.0 | 25.0 | 25.0 | 25.0 |
| | Thickener | 5.0 | 5.0 | 5.0 | 5.0 | 5.0 |
| | AHEW [g/Eq] | 97 | 93 | 154 | 116 | 79 |

Mortar Compounds and Pull-Out Tests

The epoxy resin component (A) and the curing agent component (B) were mixed in a speed mixer in a ratio resulting in a balanced stoichiometry according to the EEW and AHEW values. The mixture was poured into a one-component cartridge as far as possible without bubbles, and was immediately injected into the borehole made for the pull-out tests.

The pull-out strength of the mortar compounds obtained by mixing the epoxy resin component (A) and the curing agent component (B) according to the above examples was determined using a high-strength threaded anchor rod M12 according to ETAG 001 Part 5, which was doweled into a hammer-drilled borehole having a diameter of 14 mm and a borehole depth of 69 mm with the relevant mortar compound in C20/25 concrete. The boreholes were cleaned by means of compressed air (2×6 bar), a wire brush (2×) and again by compressed air (2×6 bar).

The boreholes were filled up, by two thirds from the bottom of the borehole, with the mortar compound to be tested in each case. The threaded rod was pushed in by hand. The excess mortar was removed using a spatula.

The curing time in test 1 was 4 hours at 25° C. In test 2, the curing time was 24 hours at 25° C.

The failure load was determined by centrally pulling out the threaded anchor rod with close support. The load values obtained with the mortar compounds using a curing agent component (B) according to examples 1 to 4 and comparative examples 1 to 5 are shown in table 10 below.

TABLE 10

Determination of the load values

| Pull-out tests | Test number | Examples | | | | Comparative examples | | | | |
|---|---|---|---|---|---|---|---|---|---|---|
| | | 1 | 2 | 3 | 4 | 1 | 2 | 3 | 4 | 5 |
| | | \multicolumn{10}{c}{Load value [N/mm$^2$]} |
| 4 h curing | 1 | 31.1 | 29.1 | 7.4 | 24.6 | 25.8 | 18.9 | 1.7 | 0.4 | 17.9 |
| 24 h curing | 2 | 34.4 | 38.8 | 35.5 | 35.0 | 37.3 | 38.2 | 36.5 | 36.8 | 36.1 |

The invention claimed is:

1. A method, comprising:
    accelerating an epoxy resin compound by combining the epoxy resin compound with at least one salt (S) selected from the group consisting of salts of nitric acid, salts of nitrous acid, salts of halogens, and combinations thereof,
    wherein the epoxy resin compound is a multi-component epoxy resin compound,
    wherein the multi-component epoxy resin compound comprises an epoxy resin component (A) which contains at least one curable epoxy resin, and a curing agent component (B) which contains at least one amine which is reactive to epoxy groups,
    wherein the epoxy resin component (A) and the curing agent component (B) are separate from one another prior to the combining so as to prevent a reaction,
    wherein the at least one amine reactive to epoxy groups is selected from the group consisting of 3-aminomethyl-3,5,5-trimethylcyclohexane (IPDA), 2-methyl-1,5-pentanediamine, m-xylylenediamine (mXDA), 1,3-bis(aminomethyl)-cyclohexane (1,3-BAC), 4,4'-methylenebis(cyclohexyl-amine) (PACM), 4-methylcyclohexyl-1,3-diamine (mCDA), 1,2-diaminocyclohexane (1,2-BAC) and mixtures thereof, and
    wherein the at least one curable epoxy resin is a diglycidyl ether of bisphenol A, diglycidyl ether of bisphenol F, hexanediol diglycidyl ether, a bisphenol A epichlorohydrin resin, a bisphenol F epichlorohydrin resin, or a mixture thereof,
    wherein the method further comprises chemical fastening by curing with the epoxy resin compound of an anchor rod, anchor bolt, rod, threaded rod, sleeve, threaded sleeve, reinforcing bar, and/or screw in a borehole.

2. The method according to claim 1, wherein prior to the combining the multi-component epoxy resin compound is present in cartridges or film pouches which comprise two or more separate chambers in which the epoxy resin component (A) and the curing agent component (B) are separately arranged so as to prevent a reaction.

3. The method according to claim 1 wherein the at least one salt (S) is selected from the group consisting of nitrate ($NO_3^-$), iodide ($I^-$), and mixtures thereof.

4. The method according to claim 1, wherein the at least one salt (S) comprises a cation selected from the group consisting of alkali metals, alkaline earth metals, lanthanides, aluminum, ammonium and combinations thereof.

5. The method according to claim 1, wherein the at least one salt (S) is present at least in the curing agent component (B).

6. The method according to claim 1, wherein the at least one salt (S) is present in the epoxy resin compound in a proportion of from 0.1 to 4 wt. % based on total weight of the epoxy resin compound.

7. The method according to claim 1, wherein the at least one curable epoxy resin is a diglycidyl ether of bisphenol A or bisphenol F or a mixture thereof.

8. A method for the chemical fastening of construction means and/or anchoring materials, the method comprising:
    chemical fastening of the construction means and/or anchoring materials by curing a multi-component epoxy resin compound which comprises an epoxy resin component (A) which contains at least one curable epoxy resin, and a curing agent component (B) which contains at least one amine which is reactive to epoxy groups,
    wherein the epoxy resin component (A) and the curing agent component (B) are separate from one another to prevent a reaction, and then combined to cure and
    wherein the epoxy resin component (A) and/or the curing agent component (B) comprises at least one salt (S) as an accelerator, and
    wherein the salt (S) is selected from the group consisting of salts of nitric acid, salts of nitrous acid, salts of halogens, and combinations thereof,
    wherein the at least one amine reactive to epoxy groups is selected from the group consisting of 3-aminomethyl-3,5,5-trimethylcyclohexane (IPDA), 2-methyl-1,5-pentanediamine, m-xylylenediamine (mXDA), 1,3-bis(aminomethyl)-cyclohexane (1,3-BAC), 4,4'-methylenebis(cyclohexyl-amine) (PACM), 4-methylcyclohexyl-1,3-diamine (mCDA), 1,2-diaminocyclohexane (1,2-BAC) and mixtures thereof, and
    wherein the at least one curable epoxy resin is a diglycidyl ether of bisphenol A, diglycidyl ether of bisphenol F, hexanediol diglycidyl ether, a bisphenol A epichlorohydrin resin, a bisphenol F epichlorohydrin resin, or a mixture thereof,
    wherein the method further comprises introducing the multi-component epoxy resin compound into a borehole prior to curing.

9. The method according to claim 8, wherein the multi-component epoxy resin compound before being combined is present in cartridges or film pouches which comprise two or more separate chambers in which the epoxy resin component (A) and the curing agent component (B) are separately arranged so as to prevent a reaction.

10. The method according to claim 9, the method further comprising:
    discharging out of the separate chambers and mixing in a static mixer or dissolver the epoxy resin component (A) and the curing agent component (B).

11. The method according to claim 1, wherein the at least one salt (S) is selected from the group consisting of salts of nitric acid, salts of nitrous acid and combinations thereof.

12. The method according to claim 11, wherein the at least one salt (S) comprises a cation selected from the group consisting of alkali metals, alkaline earth metals, lanthanides, aluminum, ammonium, and combinations thereof.

13. The method according to claim 1, wherein the at least one salt (S) is present at least in the curing agent component (B) and is present in an amount of 0.1 to 15 wt. % based on the total weight of the curing agent component (B).

14. The method according to claim 8, wherein the at least one salt (S) is selected from the group consisting of $Ca(NO_3)_2$, $Ca(NO_3)_2$ tetrahydrate, a mixture of $Ca(NO_3)_2/HNO_3$, $KNO_3$, $NaNO_3$, $Mg(NO_3)_2$, $Mg(NO_3)_2$ hexahydrate, $Al(NO_3)_3$, $Al(NO_3)_3$ nonahydrate, $NH_4NO_3$, $Ca(NO_2)_2$, NaCl, NaBr, and NaI.

15. The method according to claim 1, wherein the at least one salt (S) is selected from the group consisting of $Ca(NO_3)_2$, $Ca(NO_3)_2$ tetrahydrate, a mixture of $Ca(NO_3)_2/HNO_3$, $KNO_3$, $NaNO_3$, $Mg(NO_3)_2$, $Mg(NO_3)_2$ hexahydrate, $Al(NO_3)_3$, $Al(NO_3)_3$ nonahydrate, $NH_4NO_3$, $Ca(NO_2)_2$, NaCl, NaBr, and NaI.

\* \* \* \* \*

UNITED STATES PATENT AND TRADEMARK OFFICE
CERTIFICATE OF CORRECTION

| | | |
|---|---|---|
| PATENT NO. | : 11,673,993 B2 | |
| APPLICATION NO. | : 17/276968 | |
| DATED | : June 13, 2023 | |
| INVENTOR(S) | : Nicole Behrens, Alexander Bornschlegl and Armin Pfeil | |

It is certified that error appears in the above-identified patent and that said Letters Patent is hereby corrected as shown below:

On the Title Page

Column 1, Line 1 in Item (30), Foreign Application Priority Data, currently reads:
"8195409"
And should read:
--18195409--.

Signed and Sealed this
Thirteenth Day of February, 2024

Katherine Kelly Vidal
*Director of the United States Patent and Trademark Office*